(12) United States Patent
Wang

(10) Patent No.: US 11,368,754 B2
(45) Date of Patent: Jun. 21, 2022

(54) VIDEO PLAYING METHOD, APPARATUS, ELECTRONIC DEVICE AND STORAGE MEDIUM

(71) Applicant: BAIDU ONLINE NETWORK TECHNOLOGY (BEIJING) CO., LTD., Beijing (CN)

(72) Inventor: Jianming Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 17/191,367

(22) Filed: Mar. 3, 2021

(65) Prior Publication Data
US 2021/0258644 A1 Aug. 19, 2021

(30) Foreign Application Priority Data

Mar. 31, 2020 (CN) .......................... 202010244919.0

(51) Int. Cl.
*H04N 5/445* (2011.01)
*H04N 21/454* (2011.01)
(Continued)

(52) U.S. Cl.
CPC ......... *H04N 21/4542* (2013.01); *G06V 20/41* (2022.01); *H04N 21/4751* (2013.01); *G06V 20/44* (2022.01)

(58) Field of Classification Search
CPC .......... H04N 21/4542; H04N 21/4751; H04N 21/23418; H04N 21/25875;
(Continued)

(56) References Cited

U.S. PATENT DOCUMENTS 9,607,656 B1 3/2017 Serce
2004/0250272 A1* 12/2004 Durden .............. H04N 21/2543
725/25
(Continued)

FOREIGN PATENT DOCUMENTS

CN 105744355 A 7/2016
CN 105939487 A 9/2016
(Continued)

OTHER PUBLICATIONS

Extended European Search Report.
(Continued)

*Primary Examiner* — Jefferey F Harold
*Assistant Examiner* — Sahar Aqil Riaz
(74) *Attorney, Agent, or Firm* — J.C. Patents

(57) ABSTRACT

The present application discloses a video playing method, an apparatus, an electronic device and a storage medium, and relates to the field of video playing. A specific implementation is as follows: receiving a video playing request input by a user and starting playing a video that is requested, pausing the playing when the playing of the video reaches a target video content, and pushing prompt information to the user, where the target video content is of a higher video rating than a preset video rating of the user, and the prompt information is used to prompt the user that the target video content to be played is not suitable for the user to watch.

20 Claims, 9 Drawing Sheets

(51) Int. Cl.
*H04N 21/475* (2011.01)
*G06V 20/40* (2022.01)

(58) Field of Classification Search
CPC ....... H04N 21/25891; H04N 21/41407; H04N 21/4314; H04N 21/44008; H04N 21/4532; H04N 21/454; H04N 21/4668; H04N 21/472; H04N 21/4756; H04N 21/4826; H04N 21/25816; H04N 21/25866; H04N 21/431; H04N 21/441; H04N 21/44213; H04N 21/4627; H04N 21/488; H04N 21/4318; H04N 21/4312; H04N 21/47217; H04N 21/4882; G06K 9/00718; G06K 2009/00738
USPC .......................................................... 725/28
See application file for complete search history.

(56) References Cited

U.S. PATENT DOCUMENTS

| | | | |
|---|---|---|---|
| 2014/0068652 A1* | 3/2014 | Mountanos | G11B 27/00 725/25 |
| 2015/0100977 A1 | 4/2015 | Shieh | |
| 2015/0302890 A1* | 10/2015 | Ergen | H04N 5/76 386/349 |
| 2016/0334978 A1 | 11/2016 | Persson | |
| 2018/0359477 A1 | 12/2018 | Yang | |
| 2019/0373322 A1 | 12/2019 | Rojas-Echenique | |
| 2019/0377956 A1* | 12/2019 | Zheng | G06K 9/00711 |
| 2021/0073264 A1* | 3/2021 | Vaughn | G06F 16/483 |
| 2021/0219023 A1* | 7/2021 | Sheng | A61B 5/7425 |

FOREIGN PATENT DOCUMENTS

| | | |
|---|---|---|
| CN | 107306358 A | 10/2017 |
| CN | 107995523 A | 5/2018 |
| CN | 109889901 A | 6/2019 |
| CN | 109963164 A | 7/2019 |
| CN | 110209879 A | 9/2019 |
| CN | 110225369 A | 9/2019 |
| CN | 110392279 A | 10/2019 |
| CN | 110856013 A | 2/2020 |
| JP | H11150707 A | 6/1999 |
| JP | 2002149884 A | 5/2002 |
| JP | 2002271771 A | 9/2002 |
| JP | 2004259335 A | 9/2004 |
| JP | 2008294496 A | 12/2008 |
| JP | 2009289364 A | 12/2009 |
| JP | 2015149030 A | 8/2015 |
| JP | 2016063525 A | 4/2016 |
| JP | 2020027358 A | 2/2020 |
| KR | 10-2002-0093276 | 12/2002 |
| KR | 10-2009-0076709 | 7/2009 |
| KR | 10-1711833 | 3/2017 |

OTHER PUBLICATIONS

NPL: "Violent Scene Detection in Movies", International Journal of Pattern Recognition and Artificial Intelligence, vol. 25, No. 8 (2011) 1161-1172.
First Office Action of the priority CN application.
Second Office Action of the priority China application CN202010244919.0.
First Office Action of the parallel Japan application JP2021-039857.
First Office Action of the parallel Korea application KR2021-039857.

* cited by examiner

VIDEO PLAYING METHOD, APPARATUS, ELECTRONIC DEVICE AND STORAGE MEDIUM

CROSS-REFERENCE TO RELATED APPLICATIONS

This application claims priority to Chinese Patent Application No. 202010244919.0, filed on Mar. 31, 2020, which is hereby incorporated by reference in its entirety.

TECHNICAL FIELD

The present application relates to the field of data processing, and in particular to a video playing method, an apparatus, an electronic device, and a storage medium in video playing technologies.

BACKGROUND

With the rapid development of the Internet, users can watch videos through video applications or browser applications of terminal devices. There are various videos, and impactful pictures in the videos, such as bloody and violent pictures, may cause discomfort to users.

In the prior art, a video is examined by a video examination authority in advance, and is allowed to be played online in an application after determination is made with respect to an age group of users suitable for watching the video. When a user enters the application to watch a video, the application will also prompt the user to choose between an adult mode or a teenager mode, so that a video suitable for the user to watch is pushed according to the choice of the user and the age group of the users suitable for watching the video, thus avoiding the user from seeing an impactful picture during watching the video.

However, each user has a different acceptability of video rating. There is a low accuracy in video rating in the prior art where videos in an application are divided into videos suitable for an adult user to watch and videos suitable for a teenager to watch. For example, even if a video is rated as a video suitable for an adult user to watch, a picture played in the video may still cause discomfort to some adult users.

SUMMARY

The present application provides a video playing method, an apparatus, an electronic device, and a storage medium, which have a high accuracy in video rating, and can prevent a user from seeing an impactful picture.

A first aspect of the present application provides a video playing method, including: receiving a video playing request input by a user, and starting playing a video that is requested; pausing the playing when the playing of the video reaches a target video content, where the target video content is of a higher video rating than a preset video rating of the user; and pushing prompt information to the user, where the prompt information is used to prompt the user that the target video content to be played is not suitable for the user to watch.

The video playing method in embodiments of the present application allows for rating a video content in a video, by which and in combination with a user's acceptability of the video, when playing reaches a video content that is not suitable for the user to watch, the playing is paused and prompt information is pushed to the user, providing a highly accurate video rating and preventing the user from seeing an impactful picture, which can meet personalized needs of users and improving user experience.

A second aspect of the present application provides a video playing apparatus, including: a transceiving module, configured to receive a video playing request input by a user; a displaying module, configured to start playing a video that is requested; and a processing module, configured to pause the playing when the playing of the video reaches a target video content, where the target video content is of a higher video rating than a preset video rating of the user; the displaying module is further configured to push prompt information to the user, where the prompt information is used to prompt the user that the target video content to be played is not suitable for the user to watch.

For beneficial effects of the video playing apparatus provided by the second aspect described above, reference may be made to the beneficial effects brought about by the first aspect described above, which will not be repeated here.

A third aspect of the present application provides an electronic device, including: at least one processor, a memory, and an output apparatus, where the memory stores computer-executable instructions, and the at least one processor executes the computer-executable instructions stored in the memory to cause the electronic device to execute the method of the first aspect, and the output apparatus is configured to play a video.

A fourth aspect of the present application provides a computer-readable storage medium storing computer-executable instructions which, when executed by a processor, implement the method of the first aspect.

The present application provides a video playing method, an apparatus, an electronic device and a storage medium that allow for rating a video content in a video, in which, instead of applying a one-size-fits-all approach for all users, a user's acceptability of the video, i.e. the preset video rating of the user, is combined, and when playing reaches a video content that is not suitable for the user to watch, the playing is paused and prompt information is pushed to the user, providing a highly accurate video rating and preventing the user from seeing an impactful picture, which can meet personalized needs of users and improving user experience.

Other effects of the above method will be described below in conjunction with specific embodiments.

BRIEF DESCRIPTION OF THE DRAWINGS

The drawings are used for a better understanding of the solution and do not constitute a limitation to the present application, where.

DETAILED DESCRIPTION OF THE EMBODIMENTS

The following describes exemplary embodiments of the present application with reference to the accompanying drawings, which include various details of the embodiments of the present application to facilitate understanding, and should be regarded as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

Figure 1:
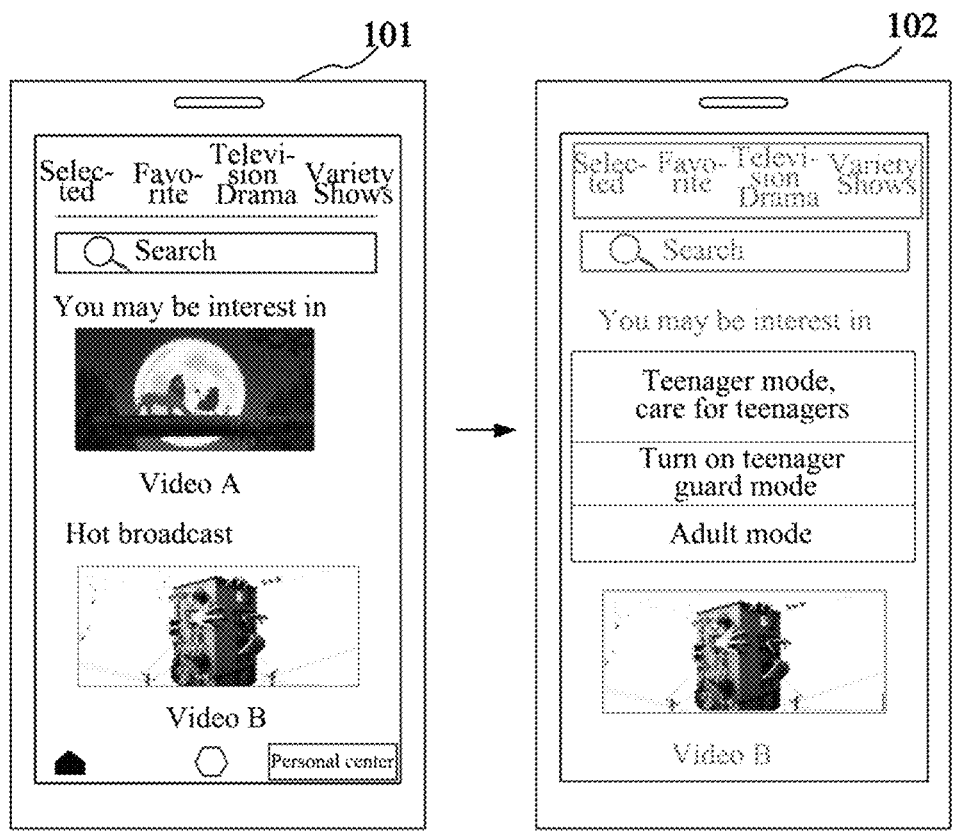
FIG. 1 is a schematic diagram of an interface change of video playing.

In order to describe a video playing method provided in the present application more clearly, a video playing method in related art will be first introduced with reference to FIG. 1. FIG. 1 is a schematic diagram of an interface change of video playing. For example, an interface 101 is an interface after a user opens a video application, on which different categories of videos may be displayed, such as Selected, Favorite, Television Drama, Variety Shows, etc. The interface 101 is a default interface displayed after the user opens the video application, such as an interface corresponding to videos of the Selected category, on which multiple video identifiers may be displayed. It should be understood that videos that can be played online in the application are all those already examined by a video examination authority. The video examination authority determines, based on a content in a video, an age group of users suitable for watching the video, such as adults or teenagers.

In related art, in order to enable a recommendation of a more suitable video for a user to watch, a video watching mode suitable for the user can be recommended when the user opens a video application. A jump from the aforementioned interface 101 to an interface 102 is provided. As shown in the interface 102, there are two video watching modes that the user can select displayed on this interface, such as an adult mode or a teenager mode. When the user selects the teenager mode, videos suitable for a teenager to watch can be recommended to the user according to age groups of users suitable for watching the videos, such as educational videos, knowledge videos, etc. When the user selects the adult mode, videos suitable for an adult to watch can be recommended to the user according to age groups of users suitable for watching the videos.

The video playing method in related art has relatively rough video rating and has a low accuracy in video rating, under which only videos can only be divided into videos suitable for an adult user to watch and videos suitable for a teenager to watch. However, each user has a different acceptability of a video, and the approach in related art cannot meet personalized needs of users.

In order to solve the above technical problem, the present application provides a video playing method, where a user can preset a video rating suitable for watching by the user, so that the video rating suitable for watching by the user can be combined to prompt a content which is not suitable for the user to watch during video playing, which can avoid the problem of user discomfort caused by the user suddenly seeing an impactful picture, thereby improving the user experience.

An entity for executing the video playing method in the present application is a video playing apparatus, which may be a terminal device, or may be a chip, a processor or the like in the terminal device. The terminal device in the present application may include, but is not limited to, a mobile terminal device or a fixed terminal device. The mobile terminal device includes, but is not limited to, a mobile phone, a personal digital assistant (PDA for short), a tablet computer, a portable device (for example, a portable computer, a pocket computer, or a handheld computer), a wearable device, etc. The fixed terminal device includes, but is not limited to, a desktop computer, a television, etc. It should be understood that the following embodiments are described by taking the terminal device being a mobile phone as an example.

Figure 2:
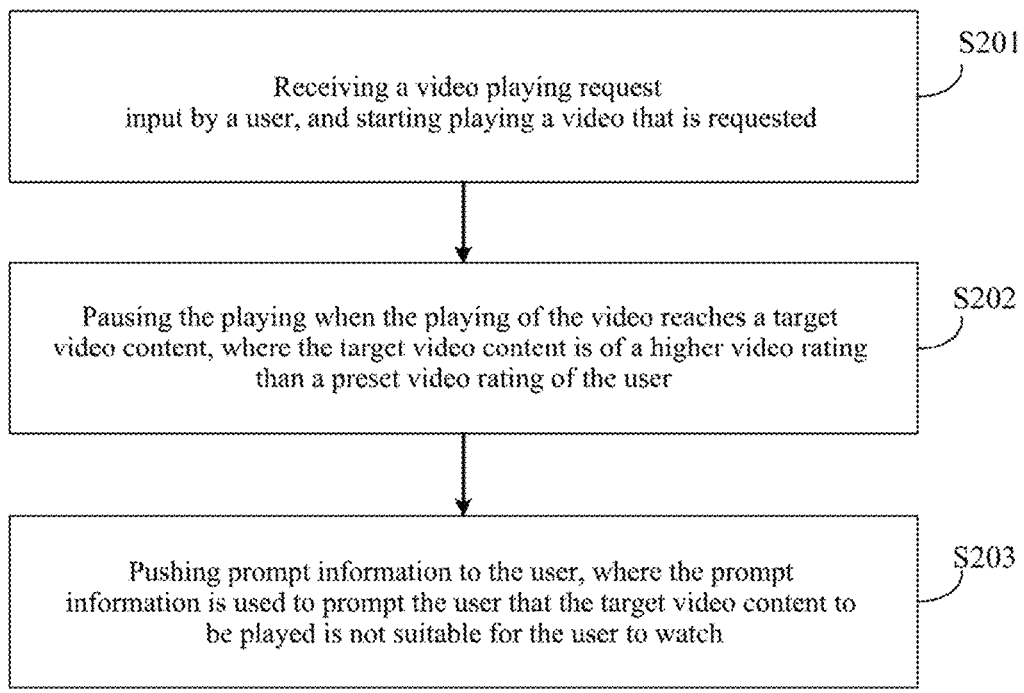
FIG. 2 is a schematic flowchart of Embodiment 1 of a video playing method provided by the present application.

The following describes the video playing method provided in the present application in conjunction with specific embodiments. The following embodiments can be combined with each other, and same or similar concepts or processes may not be repeated in some embodiments. FIG. 2 is a schematic flowchart of Embodiment 1 of a video playing method provided by the present application. As shown in FIG. 2, the video playing method provided in this embodiment can include:

S201: receiving a video playing request input by a user, and starting playing a video that is requested.

S202: pausing the playing when the playing of the video reaches a target video content, where the target video content is of a higher video rating than a preset video rating of the user.

S203: pushing prompt information to the user, where the prompt information is used to prompt the user that the target video content to be played is not suitable for the user to watch.

In the above S201, when watching a video, the user can select a video to trigger the input of a video playing request to a video playing apparatus. Taking the video playing apparatus being a mobile phone as an example, a manner in which the user inputs the video playing request may be that the user clicks an icon of a video displayed on the mobile phone, or that the user inputs a name of a video by voice. Or, taking the video playing apparatus being a television as an example, a manner in which the user inputs the video playing request may be that the user selects an icon of a video displayed on the television through a remote controller, or that the user inputs a name of a video by voice. In this embodiment, there is no restriction on how the user inputs the video playing request. For different video playing apparatuses, the user may have different video playing request methods.

Figure 3:
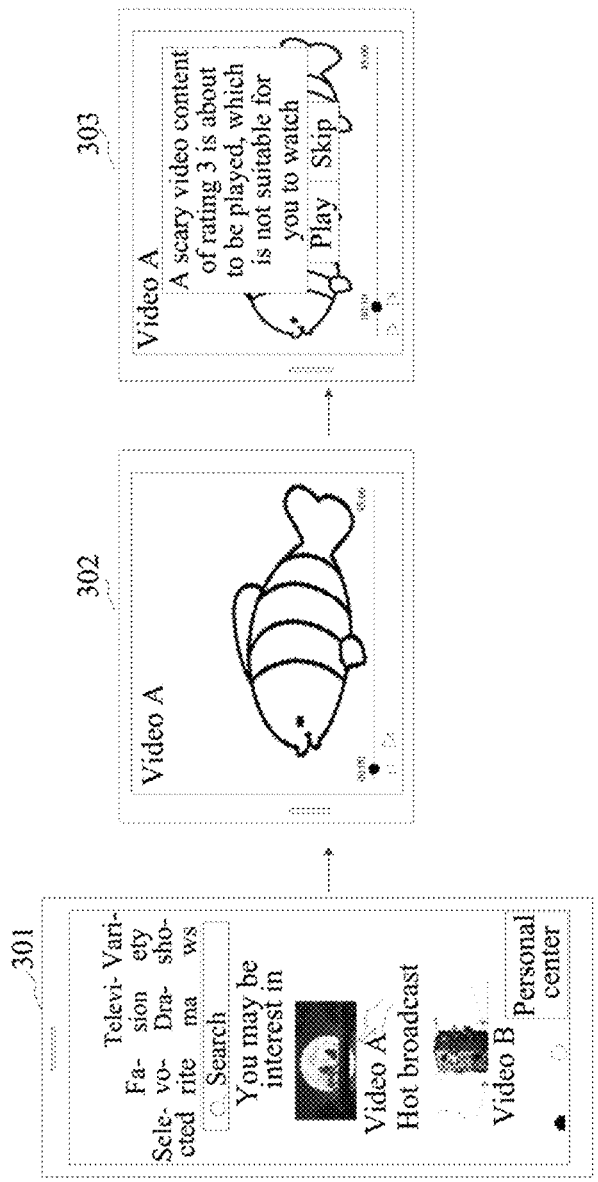
FIG. 3 is a first schematic diagram of an interface change provided by the present application.

In this embodiment, when the video playing request input by the user is received, playing of the video requested can be started. Illustratively, FIG. 3 is a first schematic diagram of an interface change provided by the present application. An interface 301 in FIG. 3 is the same as the interface 101 in FIG. 1 above. If the user selects a video A on the interface 301, a jump from the interface 301 to an interface 302 is provided to start playing the video A requested by the user. It should be understood that, in order to facilitate representation of the user watching the video A, the terminal device is placed horizontally in FIG. 3.

It should be understood that the video requested by the user may be a local video or an online video. When the video is an online video, the video requested by the user can be requested from a server, and then the video is buffered for playing.

In the above S202, the preset video rating of the user may be a video rating, which is preset by the user, of a video content that is acceptable for the user. Illustratively, if the video includes a scary video content, a video rating of the scary video content may be a rating 1, a rating 2, a rating 3, etc. The higher the video rating, the more scary the video content, and the more impactful on users. If the preset video rating of the user is the rating 2, it means that the user can accept a scary video content of the rating 2. It is understandable that if a scary video content in the video is of the rating 3, there will be a great impact on the user when the user watches this scary video content of the rating 3, that is, this scary video content of the rating 3 is not suitable for the user to watch.

It is conceivable that for a same video, if a preset video rating of another user is the rating 3, this scary video content of the rating 3 is acceptable for this user, and then the step in S202 is not executed and the target video content is directly played when this user requests to play the same video.

In this embodiment, if the target video content exists in the video, the playing can be paused when the playing of the video reaches the target video content. It should be understood that the target video content is of a higher video rating than the preset video rating of the user, that is, the target video content is a video content that is not suitable for the user to watch.

Optionally, the video in embodiments of the present application may be pre-identified with a video rating of a video content therein, and the video rating of the video content may be determined by the video examination authority during rating the video. When playing of the video is started, whether there is the target video content in the video can be determined according to the video rating of the video content in the video, so as to pause the playing when the playing of the video reaches the target video content.

In the above S203, the prompt information can be recommended to the user when the playing is paused as the playing of the video reaches the target video content. The prompt information is used to prompt the user that the target video content to be played is not suitable for the user to watch. It should be understood that the foregoing S202 and S203 may not be distinguished in order, and the two may be executed simultaneously.

Figure 4:
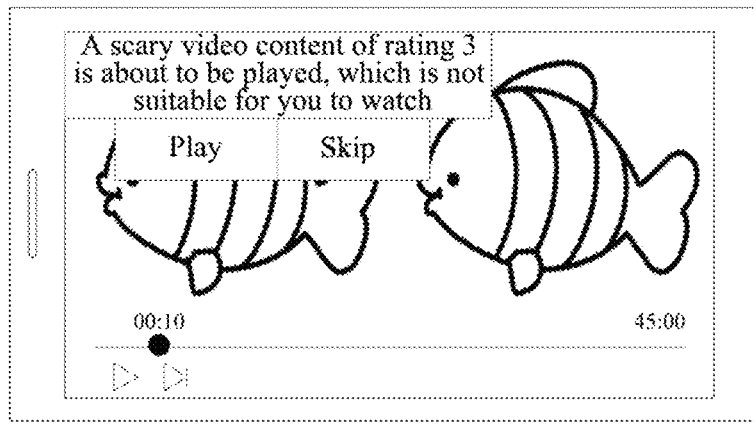
FIG. 4 is a schematic diagram of another implementation of an interface 303.

Illustratively, when the above S203 is executed, a jump from the interface 302 to an interface 303 can be provided. A picture in the video A, which is displayed when the playing is paused as the playing of the video reaches the target video content, is displayed on the interface 303, and prompt information is also displayed on the interface 303. It should be understood that, as shown in FIG. 3, the prompt information may be displayed in a manner of popping up a prompt box on an upper part of the video playing, or may be displayed in a manner of popping up a prompt box on the video playing interface. For example, in the interface 303, the prompt information displayed in a pop-up prompt box on the video playing interface is taken as an example for description. FIG. 4 is a schematic diagram of another implementation of the interface 303. For an interface displayed in FIG. 4, the prompt information can be displayed in a manner of popping up the prompt box on the upper part of the video playing. It should be understood that the interface 303 is taken as an example for description in the following embodiments. In this embodiment, a position where the prompt box is displayed is not limited. As shown in the interface 303, text prompt information such as "a scary video content of rating 3 is about to be played, and is not suitable for you to watch" is displayed on the interface 303.

Optionally, a "skip" control may also be displayed on the interface 303. The "skip" control instructs to skip the target video content, because the user is not suitable for watching the target video content. The user can select the "skip" control to skip the target video content, thereby preventing the user from seeing an impactful picture.

Optionally, a "play" control may also be displayed on the interface 303. The "play" control instructs to play the target video content, and the user can try to watch the target video content on the premise of being prepared. It should be understood that the "play" control is an optional control, and is described here to represent possible implementations in this embodiment, so as to meet the personalized needs of users.

The video playing method provided in this embodiment includes: receiving the video playing request input by the user and starting playing the video that is requested, pausing the playing when the playing of the video reaches the target video content, and pushing the prompt information to the user, where the target video content is of a higher video rating than the preset video rating of the user, and the prompt information is used to prompt the user that the target video content to be played is not suitable for the user to watch. This embodiment allows for rating a video content in a video, in which, instead of applying a one-size-fits-all approach for all users, a user's acceptability of the video, i.e. the preset video rating of the user, is combined, so that when playing reaches a video content that is not suitable for the user to watch, the playing is paused and prompt information is pushed to the user, providing a highly accurate video rating and preventing the user from seeing an impactful picture, which can meet personalized needs of users and improving user experience.

Figure 5:
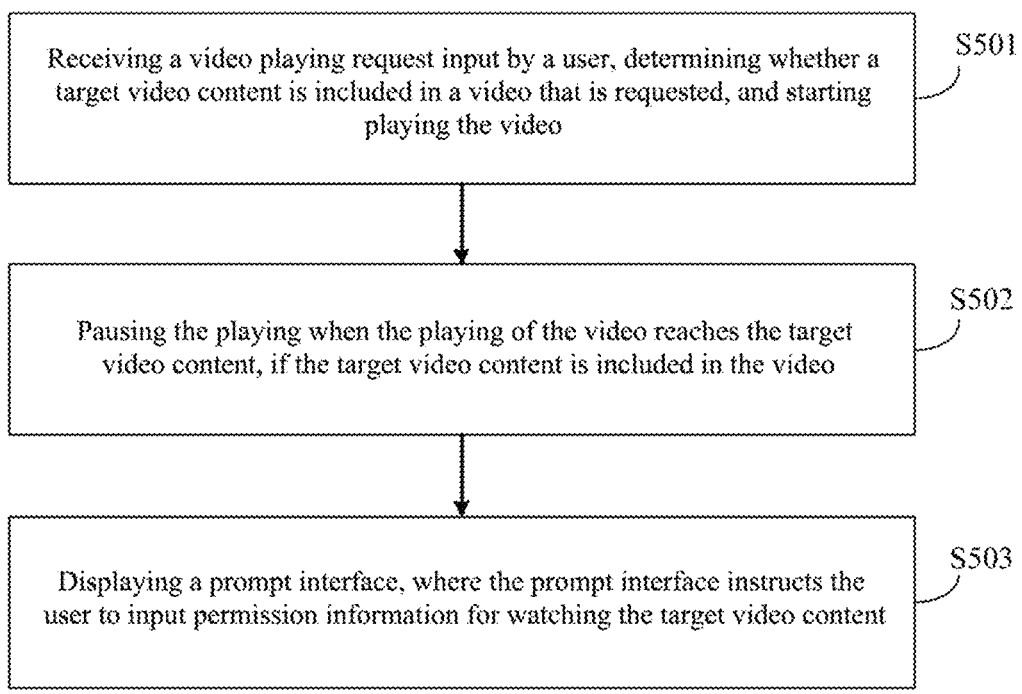
FIG. 5 is a schematic flowchart of Embodiment 2 of a video playing method provided by the present application.

On the basis of the foregoing embodiments, the video playing method provided in the present application will be further described in detail below with reference to FIG. 5. FIG. 5 is a schematic flowchart of Embodiment 2 of a video playing method provided by the present application. As shown in FIG. 5, the video playing method provided in this embodiment can include:

S501: receiving a video playing request input by a user, determining whether a target video content is included in a video that is requested, and starting playing the video.

S502: pausing the playing when the playing of the video reaches the target video content, if the target video content is included in the video.

S503: displaying a prompt interface, where the prompt interface instructs the user to input permission information for watching the target video content.

In the above S501, when the video playing request input by the user is received, whether the target video content is included in the video that is requested can be determined, and then the playing of the video requested is started. When the video requested by the user is a local video, whether the target video content is included in the local video can be determined. When the video requested by the user is an online video, the video can be requested from a server, and then the video may be buffered to determine whether the target video content is included in the buffered video.

It should be understood that, in this embodiment, when the video is requested from the server, the server sends the video in a form of video frames. For example, the server sends 0 s-60 s video frames of the video, so that the 0 s-60 s video frames are buffered, and then 61 s-120 s video frames of the video sent by the server is received, so that the 61 s-120 s video frames are buffered. When the video frames of the video are received from the server, the video frames can be buffered, and the buffered video frames include the target video content. Correspondingly, playing the video means playing the buffered video frames. It should be understood that, regardless of whether the user requests a local video or an online video, the manner of determining whether the target video content is included in the video can be the same. The manner of determining whether the target video content is included in the buffered video frames is also the same as that of whether the target video content is included in the video. The following describes the determination of whether the target video content is included in the video in the present application from three possible implementation modes:

A first mode: in this embodiment, a video content recognition model is pre-stored, and the video can be input into the pre-trained video content recognition model to determine whether the target video content is included in the video.

The video content recognition model is used to recognize whether the target video content is included in the video, which can quickly and accurately determine whether the target video content is included in the video.

The video content recognition model is used to recognize a sensitive video content in the video and a video rating of the sensitive video content. It should be understood that the sensitive video content may be of violence, pornography, bloodiness, etc., and the video rating of the sensitive video content may be, for example, a violence rating, including violence 1, violence 2, violence 3, etc.

It should be understood that training parameters for training the video content recognition model can be sensitive video contents of different video ratings, and the sensitive video contents can be sensitive images or sensitive video frames. Taking the sensitive video contents being sensitive images as an example, the training parameters can be sensitive images of different types, and sensitive images of a same type include sensitive images of different video ratings. Illustratively, for example, the training parameters may include violent images with violent image ratings of 1, 2, and 3, bloody images with bloody image ratings of 1, 2, and 3, and pornographic images with pornographic image ratings of 1, 2, and 3, etc., in order to train the video content recognition model. In this embodiment, a training manner for training the video content recognition model is not limited, and the training manner in related art can be referred to.

Optionally, the video content recognition model in this embodiment can include multiple video content recognition sub-models, so that multiple video content recognition sub-models can be used to recognize sensitive video contents in the video and the video ratings of the sensitive video contents. For example, violent images with violent image ratings of 1, 2, and 3 can be used as training parameters to train and acquire a video content recognition model for recognizing violent videos, and likewise for other types of training images. These multiple video content recognition sub-models can also be used to recognize the sensitive video content in the video and the video rating of the sensitive video content.

In this embodiment, the video can be input into the pre-trained video content recognition model to obtain the sensitive video content included in the video and the video rating of the sensitive video content, and then whether the target video content is included in the sensitive video content is determined according to the preset video rating of the user.

Illustratively, if the video A is input into the pre-trained video content recognition model, the sensitive video content included in the video A is obtained to be a violent content and the video rating of the sensitive video content to be the rating 3, and the preset video rating of the user is the rating 2, then it can be determined that the target video content is included in the sensitive video content.

In this mode, the video content recognition model is used to recognize the sensitive video content and the video rating of the sensitive video content, so as to determine whether the target video content is included in the sensitive video content. The video content recognition model is obtained through by training with a large amount of training data, providing a high accuracy for determining the sensitive video content in the video and the video rating of the sensitive video content.

A second mode: the video in this embodiment carries corresponding file information. The file information may include information about the video, such as a brief introduction of the video, a download time of the video, an online time of the video, etc. For a local video, the file information of the video is sent by the server when the video is requested from the server, and the file information can be stored correspondingly to the local video. For an online video, the file information of the video is sent by the server when the video is requested from the server.

In a possible implementation, when the video is requested from the server, the preset video rating of the user can be sent to the server. Correspondingly, the server can determine whether there is the target video content in the video according to the preset video rating of the user. When the server determines that there is the target video content in the video, indication information can be carried in the file information of the video, and the indication information is used to indicate whether the target video content is included in the video. When the server determines that the target video content is not included in the video, the indication information may not be carried in the file information of the video. Correspondingly, whether the file information of the video includes the indication information can be determined, so as to determine whether there is the target video content in the video. When the file information of the video includes the indication information, it is determined that the video includes the target video content; and when the file information of the video does not include the indication information, it is determined that the video does not include the target video content.

It should be understood that the server first determines whether there is a sensitive video content in the video, determines the video rating of the sensitive video content when the sensitive video content is included in the video, and then determines whether the video includes the target video content according to the video rating of the sensitive video content and the preset video rating of the user. When the video rating of the sensitive video content is greater than the preset video rating of the user, it is determined that the video includes the target video content; and when the video rating of the sensitive video content is less than or equal to the preset video rating of the user, it is determined that the video does not include the target video content. It should be understood that with respect to the manner of the server determining whether there is the sensitive video content in the video requested, and determining the video rating of the sensitive video content when the sensitive video content is included in the video, reference can be made to the related descriptions in the first and third modes.

In this possible implementation, the server can determine whether the video includes the target video content according to the preset video rating of the user and a video content, and then give an indication in the file information of the video, so that the video playing apparatus can determine whether the video requested by the user includes the target video content.

In a possible implementation, when the video is requested from the server, the preset video rating of the user may not be sent to the server. The server can determine whether there is a sensitive video content in the video that is requested, and determine the video rating of the sensitive video content when the sensitive video content is included in the video. It should be understood that with respect to the manner of the server determining whether there is the sensitive video content in the video requested, and determining the video rating of the sensitive video content when the sensitive video content is included in the video, reference can be made to the related descriptions in the first and third modes.

If the server determines that there is the sensitive video content in the video, the video rating of the sensitive video content is determined, and the sensitive video content and the video rating of the sensitive video content are carried in the file information of the video. If the server determines that the video does not include the sensitive video content, the file information of the video does not carry the sensitive video content and the video rating of the sensitive video content.

Correspondingly, whether there is the target video content in the video can be determined according to the determination of whether the file information of the video includes the indication information. In this possible implementation, the indication information is used to indicate whether the video includes the sensitive video content and the video rating of the sensitive video content.

It should be understood that if the file information of the video includes the indication information, whether the sensitive video content includes the target video content is determined according to the preset video rating of the user. If the video rating of the sensitive video content indicated by the indication information is greater than the preset video rating of the user, it is determined that the sensitive video content includes the target video content, and if the video rating of the sensitive video content indicated by the indication information is less than or equal to the preset video rating of the user, it is determined that the sensitive video content does not include the target video content. Correspondingly, if the file information of the video does not include the indication information, it is determined that the video does not include the target video content.

In this possible implementation, the sensitive video content in the video and the video rating of the sensitive video content can be determined by the server which then gives an indication in the file information of the video, so that the video playing apparatus can determine whether the video requested by the user includes the target video content according to the preset video rating of the user and the file information of the video.

In this mode, regardless of determining by the server whether the video includes the target video content to further give an indication in the file information of the video, or determining by the server whether the video includes the sensitive video content and the video rating of the sensitive video content and then determining by the video playing apparatus whether the video requested by the user includes the target video content, the purpose of determining the target video content can be achieved, facilitating a control of video playing.

A third mode: in this embodiment, a picture color of a video frame included in the video can be recognized to determine whether the video includes the target video content. If the video includes a target video frame, it is determined that the video includes the target video content. It should be understood that the target video frame is a video frame in which a proportion of a region of a target color in a picture is greater than a proportion threshold.

The target color is a skin color or a blood color. In this embodiment, when the picture color of the video frame included in the video is recognized, if it is determined that the picture color of the video frame is the skin color or the blood color, a proportion of a region of the skin color or the blood color in the picture in the video is determined. If the proportion is greater than the proportion threshold, the video frame is determined as the target video frame. It should be understood that the proportion threshold may be pre-appointed or set by the user. The personalized needs of the user can be met by the user setting the proportion threshold, since acceptability of different users on an area of the target color is different, that is, some users can accept the blood color of a small area, but cannot accept the blood color of a full screen.

In this mode, whether the video includes the target video content can be recognized according to the picture color of the video frame, which facilitates the control of video playing.

Optionally, in this embodiment, on the basis of the above-mentioned recognition of the picture color of the video frame, when it is determined that the target video frame is included in the video, whether a duration of continuous appearance of the target video frame is greater than a duration threshold can also be determined. If the duration of continuous appearance of the target video frame is greater than the duration threshold, it is determined that the video includes the target video content. It should be understood that the duration threshold may be pre-appointed, or set by the user.

It should be understood that different users may have different acceptability on the duration of the target video frame. For example, some users can accept transient target video frame, but watching the target video frame for a long time will cause discomfort to them. Therefore, in this mode, according to the duration of continuous appearance of the target video frame, the personalized needs of the user can be met by determining that the video includes the target video content when the duration is greater than the duration threshold.

It should be understood that when the target video content is included in the video, the operation in S502 can be performed. For the implementation in S502, reference may be made to the related description in S202 in the foregoing embodiment, which will not be repeated here. It is worth noting that when it is determined that the video includes the target video content according to any one of the three modes in the above S501, a playing starting time of the target video content can also be acquired, so that when performing the "pausing the playing when the playing of the video reaches a target video content" in the above S502, the playing can be paused when the playing of the video reaches the playing starting time.

Correspondingly, the following correspondingly describes the way of acquiring the playing starting time of the target video content when the target video content is determined to be included in the video in the above three modes.

In the first mode, it should be understood that when the video is input into the pre-trained video content recognition model, the input can be a video frame in the video and an identifier of the video frame, where the identifier of the video frame is for example a serial number of the video frame, and the serial number of the video frame corresponds to a playing time of the video frame in the video.

The video content recognition model can recognize whether each video frame in the video includes a sensitive video content and the video rating of the sensitive video content. Optionally, when determining that a video frame includes the sensitive video content, the video content recognition model can output the identifier of this video frame, such as a serial number of this video frame. Correspondingly, in this embodiment, after the video frame including the target video content is determined, the serial number of the video frame including the target video content can be acquired, so that the playing time of the video frame including the target video content in the video can be determined according to the serial number of the video frame and a correspondence between the serial number of the video frame and the playing time of the video frame in the video, and the playing time is determined as the playing starting time of the target video content in the video. Correspondingly, in this embodiment, pausing the playing when the playing of the video reaches the target video content is pausing the playing when the playing of the video reaches the playing starting time.

In the second mode, the file information of the video also includes the playing starting time of the target video content, or the file information of the video also includes the playing starting time of the sensitive video content. It should be understood that, when the server determines that the video includes the sensitive video content according to the first mode or the third mode described above, the server can acquire the playing starting time of the sensitive video content in the video.

Correspondingly, in this mode, if the file information of the video also includes the playing starting time of the sensitive video content, the server can determine the playing starting time of the target video content according to the playing starting time of the sensitive video content in the video when determining that the target video content is included in the sensitive video content according to the preset video rating of the user, and then carry the playing starting time of the target video content in the file information of the video.

Correspondingly, in this mode, if the file information of the video also includes the playing starting time of the sensitive video content, after the playing starting time of the sensitive video content in the video is acquired, the playing starting time of the sensitive video content is carried in the file information of the video, so that the video playing apparatus can determine the playing starting time of the target video content according to the playing starting time of the sensitive video content in the video when determining that the target video content is included in the sensitive video content according to the preset video rating of the user.

Correspondingly, in either mode as described above, in this embodiment, pausing the playing when the playing of the video reaches the target video content is pausing the playing when the playing of the video reaches the playing starting time.

In the third mode, since the target video frame in this embodiment is obtained to be a video frame that includes the target video content based on an analysis of the picture color of the video frame included in the video, the playing starting time of the target video frame in the video can be determined according to the identifier of the target video frame and a correspondence between the identifier of the video frame and the playing starting time of the video frame in the video. Correspondingly, in this embodiment, pausing the playing when the playing of the video reaches the target video content is pausing the playing when the playing of the video reaches the playing starting time. It should be understood that the identifier of the target video frame may be a serial number of the target video frame, such as a frame number.

In the above S503, the manner of pushing the prompt information to the user in this embodiment is to display a prompt interface, which instructs the user to input permission information for watching the target video content. That is to say, the user can watch the target video content after inputting correct permission information, which can prevent other users from watching the target video content due to misoperation which further causes discomfort to other users.

Figure 6:
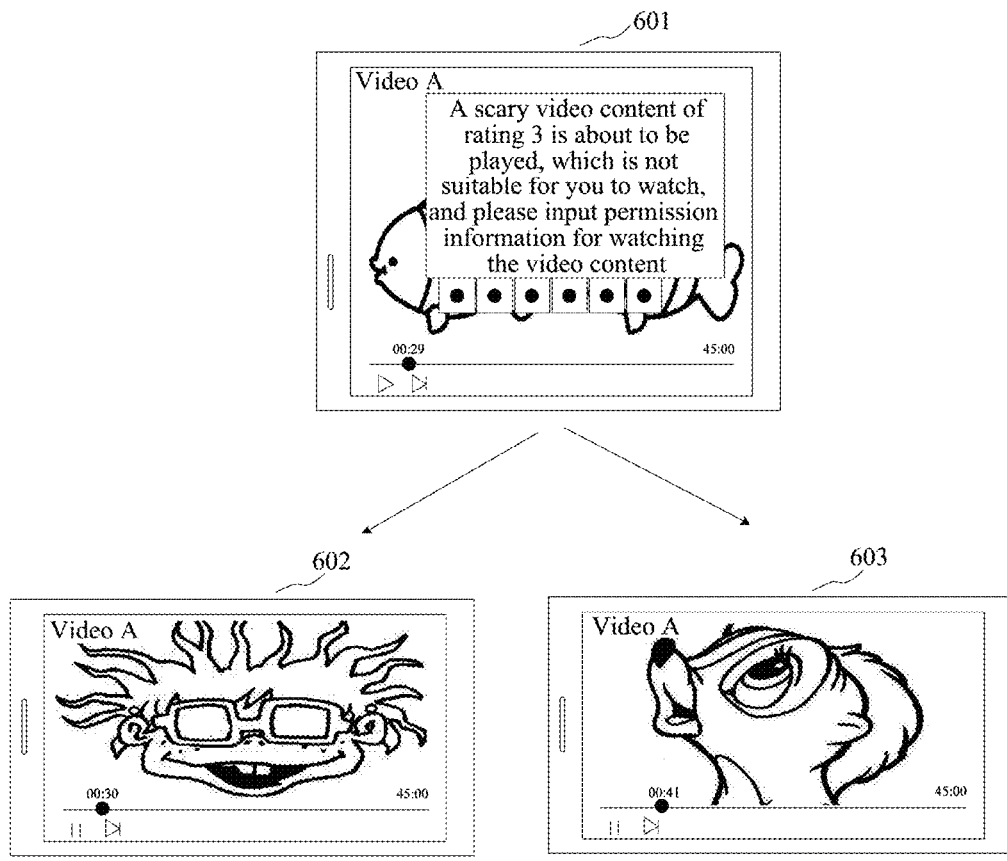
FIG. 6 is a second schematic diagram of an interface change provided by the present application.
Figure 7:
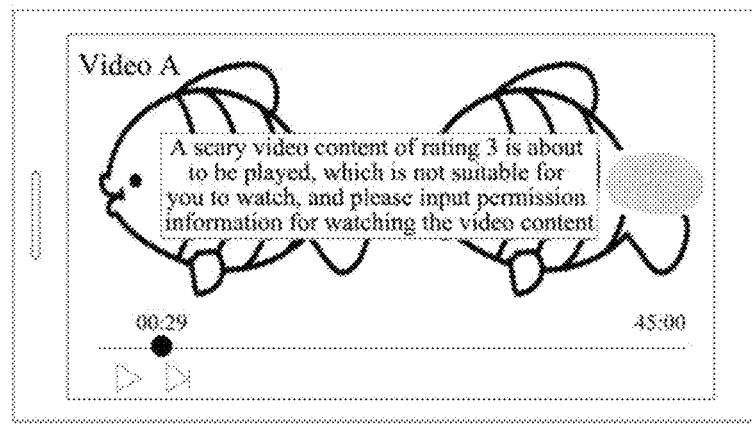
FIG. 7 is a schematic diagram of another implementation of an interface 601 provided by the present application.

Illustratively, FIG. 6 is a second schematic diagram of an interface change provided by the present application. As shown in an interface 601 in FIG. 6, the interface 601 is an alternative to the interface 303 in FIG. 3 or the interface in FIG. 4. As shown in the interface 601, text information such as "a scary video content of rating 3 is about to be played, which is not suitable for you to watch, and please input permission information for watching the video content" is displayed on the interface. Optionally, the permission information is a verification password or biological information of the user. Illustratively, taking the permission information on the interface 601 being the verification password as an example for description, for example, an input box for inputting the verification password is also displayed below the text information. It should be understood that FIG. 7 is a schematic diagram of another implementation of the interface 601 provided by the present application. As shown in FIG. 7, the permission information is the biological information of the user, for example, fingerprint information of the user, and then the user can input a fingerprint on the interface.

In this embodiment, the permission information input by the user can be received, and whether the permission information input by the user is correct can be verified. When the permission information input by the user is correct, the target video content can be played. Illustratively, if the user inputs a correct verification password on the interface 601, a jump from the interface 601 to an interface 602 is provided, and the target video content is played on the interface 602. When the permission information input by the user is incorrect, the playing of the target video content can be skipped.

It should be understood that skipping playing the target video content refers to playing a video content corresponding to a playing ending time of the target video content. Illustratively, if the target video content is a video segment between the $30^{th}$ second and the $40^{th}$ second in the video, the playing ending time of the target video content may be the $41^{st}$ second. Illustratively, if the user inputs an incorrect verification password on the interface 601, a jump from the interface 601 to an interface 603 is provided, and what is displayed on the interface 603 is a video content subsequent to skipping playing target video content. Specifically, in order to further represent the difference between the interface 602 and the interface 603, a playing time is displayed thereon. Illustratively, if the target video content is played between the 30th second and the 40th second, what is displayed on the interface 602 is the target video content at the 30th second in the video, while what is displayed on the interface 603 is a video content at the 40th second.

Figure 8:
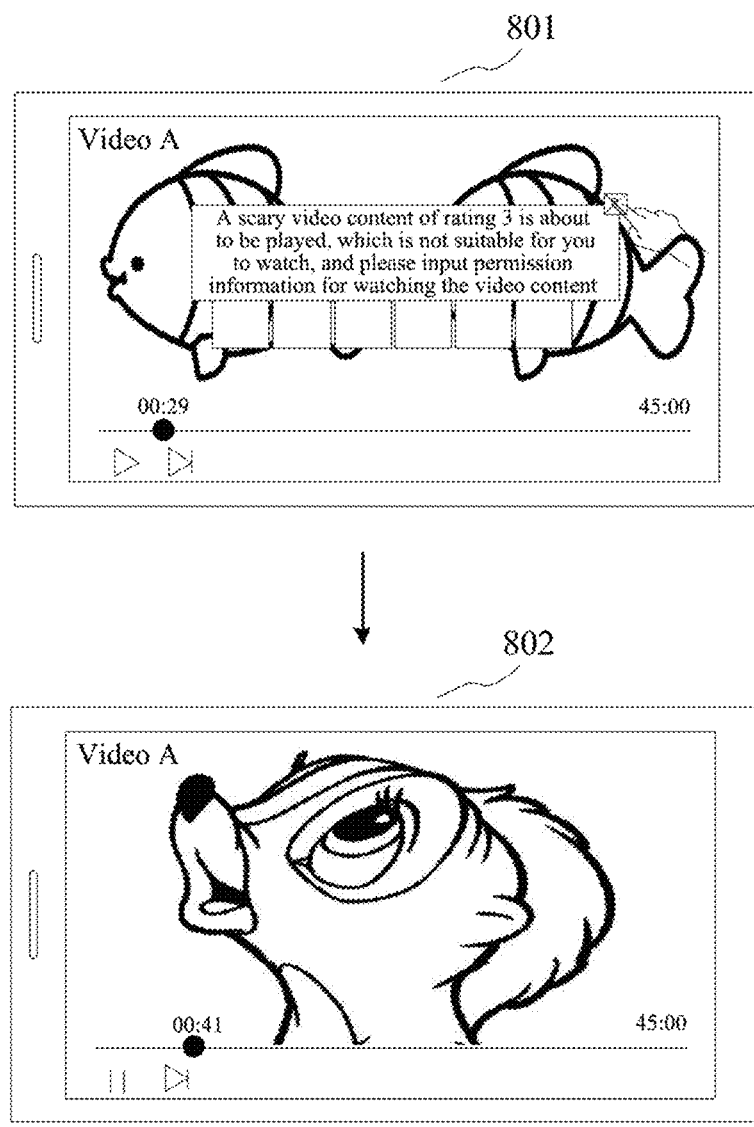
FIG. 8 is a third schematic diagram of an interface change provided by the present application.

FIG. 8 is a third schematic diagram of an interface change provided by the present application. As shown in an interface 801 in FIG. 8, the interface 801 is another implementation of the interface 601. In this embodiment, the prompt interface may be displayed with a close control thereon, and the close control instructs to skip playing the target video content. As shown in the interface 801, the close control is displayed on the interface 801. The playing of the target video content is skipped if an instruction for selecting the close control is received from the user. Correspondingly, as shown in the interface 801 in the figure, the user selects the close control, and then a jump from the interface 801 to an interface 802 is provided, and correspondingly, what is displayed on the interface 802 is a video content at the 41st second.

In this embodiment, whether the target video content is included in the video requested by the user can be determined, and then the playing is paused when the playing of the video reaches the target video content, and the prompt interface is played, which can prevent the user from seeing an impactful picture which further causes discomfort to the user. Moreover, in the prompt interface of this embodiment, the user can choose to input correct permission information to watch the target video content, or can close the prompt interface to skip playing the target video content, which can meet personalized needs of the user.

Figure 9:
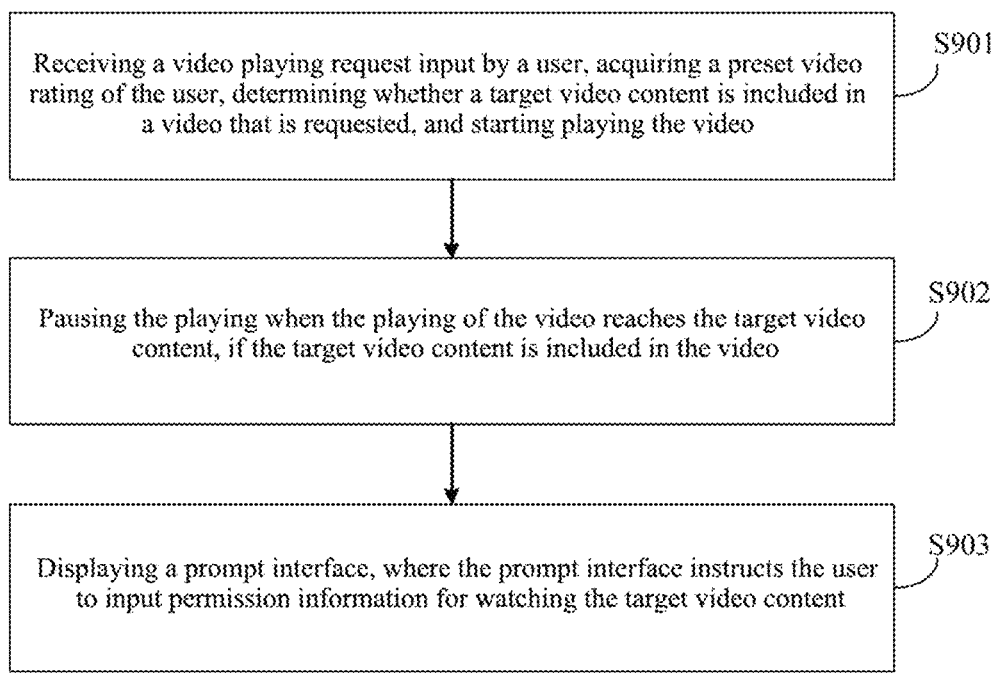
FIG. 9 is a schematic flowchart of Embodiment 3 of a video playing method provided by the present application.

In this embodiment, the user can set a preset video rating in advance. The process of setting a video rating by the user and the process of determining the preset video rating of the user in the present application will be described below with reference to FIG. 9. FIG. 9 is a schematic flowchart of Embodiment 3 of a video playing method provided by the present application. As shown in FIG. 9, the video playing method provided in this embodiment can include:

S901: receiving a video playing request input by a user, acquiring a preset video rating of the user, determining whether a target video content is included in a video that is requested, and starting playing the video.

S902: pausing the playing when the playing of the video reaches the target video content, if the target video content is included in the video.

S903: displaying a prompt interface, where the prompt interface instructs the user to input permission information for watching the target video content.

It should be understood that with respect to the implementations in S902-S903, reference can be made to the relevant descriptions in S502-S503 in the above-mentioned embodiments, which are not repeated here.

The acquiring the preset video rating of the user in S901 can be achieved by acquiring setting information from the user and using a preset video rating of the user in the setting information from the user as the preset video rating of the user. It should be understood that the setting information is setting information when the user sets the preset video rating, and the setting information includes the preset video rating of the user.

Figure 10:
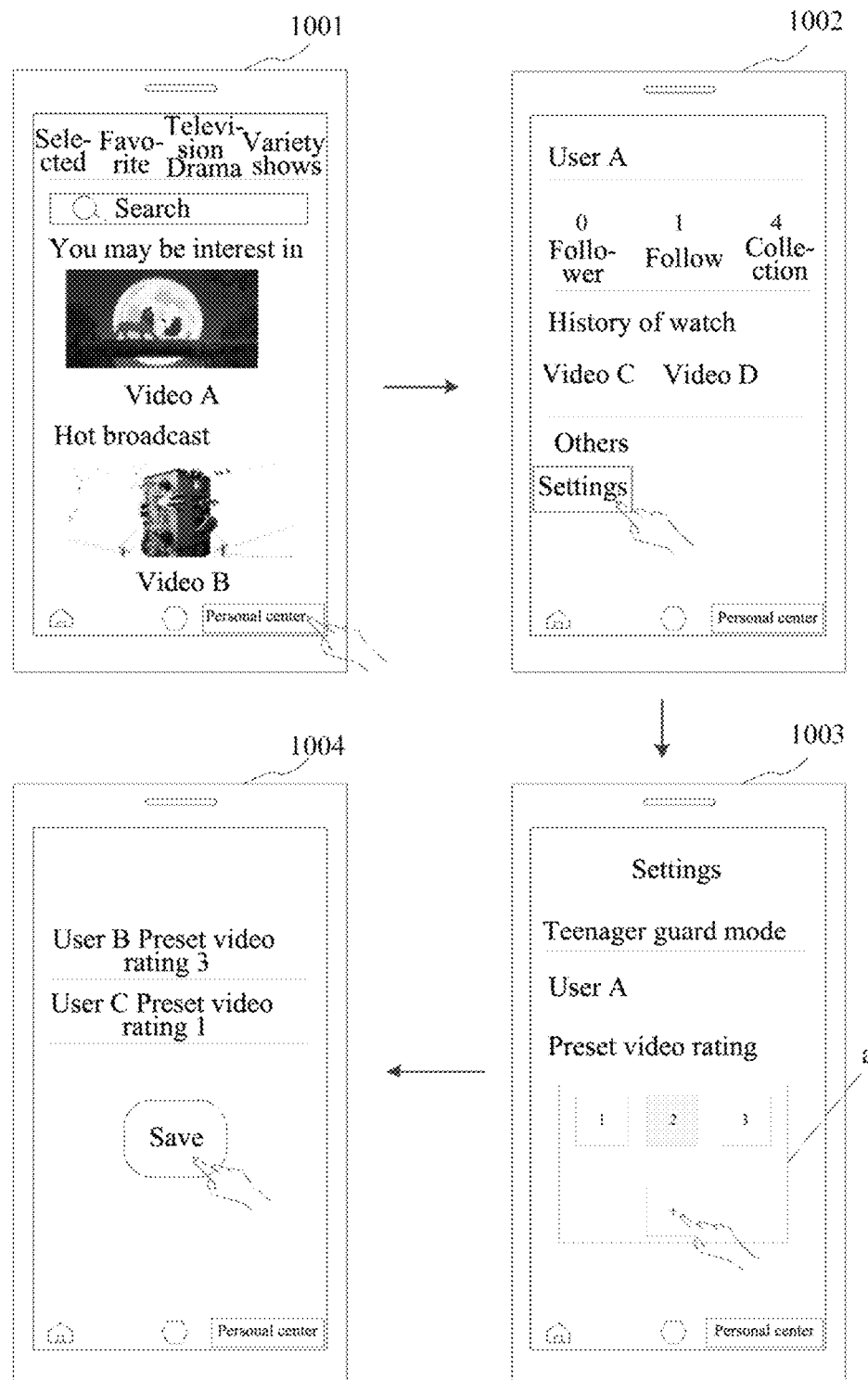
FIG. 10 is a fourth schematic diagram of an interface change provided by the present application.

FIG. 10 is a fourth schematic diagram of an interface change provided by the present application. As shown in FIG. 10, an interface 1001 can be the same as the above interface 601. The interface 1001 includes a "personal center" control thereon. The user selects the "personal center" control to enter an interface for setting the preset video rating of the user. A jump from the interface 1001 to an interface 1002 can be provided correspondingly. The interface 1002 can be displayed with a "settings" control thereon. The user clicks the "settings" control, that is, a video rating setting request is input by the user. Correspondingly, when the video rating setting request input by the user is received, a first setting interface is displayed, and the user can input setting information on the first setting interface.

A jump from the aforementioned interface 1002 to an interface 1003 can be provided, and the interface 1003 is the first setting interface. The interface 1003 is displayed with an identifier of the user, such as "User A", and a preset video rating setting area a. The user can input a preset video rating in the preset video rating setting area, or the user can select a video rating in the preset video rating setting area. For example, a description may be made by taking the user selecting a video rating in the preset video rating setting area on the interface 1003 as an example.

Illustratively, the preset video rating setting area on the interface 1003 can be displayed with video ratings to be selected, such as 1, 2 and 3 shown in a box. If the user selects the rating 2, the preset rating of the user can be 2. In FIG. 10, the preset rating of the user identified by gray shading is 2. It is conceivable that the interface 1003 may be displayed with preset video ratings of various types of video contents, such as video ratings of violent contents, video ratings of bloody contents, and so on. FIG. 10 is only an example.

In this embodiment, the preset video rating input by the user on the first setting interface can be received, and this preset video rating can be used as the preset video rating of the user. For example, the video rating 2 can be used as the preset video rating of the user.

In a possible implementation, the first setting interface further includes an add control, and the add control instructs to add a setting of a preset video rating of other user. That is, in this embodiment, the user can also set preset video ratings of multiple users, so that when other users use the terminal device to play a video, an accurate preset video rating of a user who is currently watching the video can be determined.

Correspondingly, an add control can be displayed on the interface 1003, and if an instruction for selecting the add control is received from the user, a second setting interface can be displayed. Correspondingly, a jump from the interface 1003 to an interface 1004 is provided, and the interface 1004 instructs the user to input an identifier and a preset video rating of other user. As shown in the interface 1004, the user can input an identifier of user B, i.e. "User B", and a preset video rating of user B, i.e. 3; and the user can input an identifier of user C, i.e. "User C", and a preset video rating of user C, i.e. 1. Correspondingly, the video playing apparatus can receive identifiers and preset video ratings of other users input by the user on the second setting interface.

It is conceivable that a save control is displayed on the second setting interface to save the setting information of the user. Correspondingly, the setting information of the user may include: the identifier of user A and the preset video rating corresponding to user A, the identifier of user B and the preset video rating corresponding to user B, the identifier of user C and the preset video rating corresponding to user C.

It should be understood that if there is only one identifier of one user and the preset video rating corresponding to the one user in the setting information, the preset video rating can be used as the preset video rating of the user currently watching the video. However, the setting information in this embodiment includes an identifier of at least one user and a preset video rating corresponding to an identifier of each user.

Correspondingly, in this scenario, a manner in which the preset video rating of the user can be determined in this embodiment can be as follows.

A facial image of a user is acquired, and an identifier of the user is determined according to the facial image. The video playing apparatus in this embodiment stores a correspondence between the facial image and the identifier of the user. The identifier of the user can be determined according to the facial image of the user and the correspondence between the facial image and the identifier of the user. Then the preset video rating of the user is determined according to the identifier of the user and the setting information.

It should be understood that when the number of the identifier of the user is determined to be one according to the facial image of the user, the preset video rating corresponding to the identifier of the user in the setting information may be used as the preset video rating of the user. Illustratively, if a user watching the video is user A, an identifier of the user A can be determined to be "User A" according to the facial image of the user A, and then the preset video rating 2 of user A can be used as the preset video rating of the user.

When the number of the identifier of the user is determined to be more than one according to the facial image of the user, video ratings of respective users watching the video can be determined according to identifiers of the respective users watching the video and the setting information, and a lowest video rating among the users watching the video is determined as the preset video rating of the user.

Illustratively, if the users watching the video are user A, user B, and user C, identifiers of the users A, B and C can be determined as "User A", "User B" and "User C", respectively, according to facial images of user A, user B, and user C, and then, the video rating 1, which is the lowest video rating among user A, user B, and user C, can be determined as the preset video rating of the user.

It should be understood that after the preset video rating of the user is determined in this embodiment, the operation of determining whether the target video content is included in the video and starting playing the video that is requested can be performed according to the relevant description in S501 in the above embodiments.

In this embodiment, the user can set the preset video rating in advance, and then whether there is the target video content in the video can be determined according to the preset video rating of the user. Moreover, in this embodiment, the user can also set the preset video ratings of multiple users. When multiple users watch a video together, the lowest video rating among the users watching the video can be used as the preset video rating of the user to guarantee the watching experience of each user, thus improving the user experience.

Figure 11:
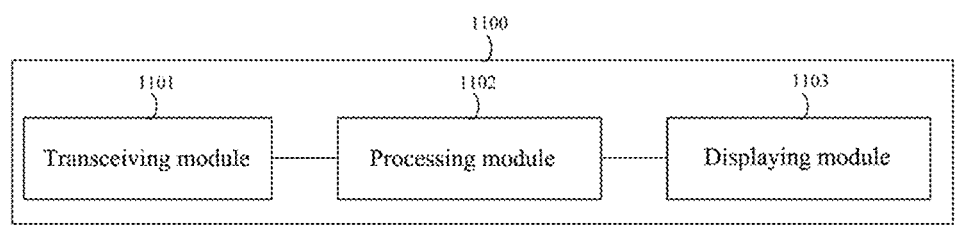
FIG. 11 is a schematic structural diagram of a video playing apparatus provided by the present application.

FIG. 11 is a schematic structural diagram of a video playing apparatus provided by the present application. As shown in FIG. 11, a video playing apparatus 1100 includes: a transceiving module 1101, a processing module 1102, and a displaying module 1103.

The transceiving module 1101 is configured to receive a video playing request input by a user.

The displaying module 1103 is configured to start playing a video that is requested.

The processing module 1102 is configured to pause the playing when the playing of the video reaches a target video content, where the target video content is of a higher video rating than a preset video rating of the user.

The displaying module 1103 is further configured to push prompt information to the user, where the prompt information is used to prompt the user that the target video content to be played is not suitable for the user to watch.

In a possible design, the processing module 1102 is further configured to: determine whether the target video content is included in the video; and execute the step of pausing the playing when the playing of the video reaches the target video content, if the target video content is included in the video.

In a possible design, the processing module 1102 is specifically configured to input the video into a pre-trained video content recognition model to determine whether the target video content is included in the video.

In a possible design, the processing module 1102 is specifically configured to: input the video into the pre-trained video content recognition model to obtain a sensitive video content included in the video and a video rating of the sensitive video content; and determine whether the target video content is included in the sensitive video content according to the preset video rating of the user.

In a possible design, the processing module 1102 is further configured to acquire an identifier of a video frame of the target video content in the video, and determine a playing starting time of the target video content in the video according to the identifier of the video frame; and correspondingly, the processing module 1102 is specifically configured to pause the playing when the playing of the video reaches the playing starting time.

In a possible design, the processing module 1102 is specifically configured to determine whether file information of the video includes indication information, where the indication information is used to indicate whether the target video content is included in the video.

In a possible design, the processing module 1102 is specifically configured to: determine whether file information of the video includes indication information, where the indication information is used to indicate whether the video includes a sensitive video content and a video rating of the sensitive video content; and determine whether the target video content is included in the sensitive video content according to the preset video rating of the user, if the indication information is included in the file information of the video.

In a possible design, the file information of the video further includes a playing starting time of the target video content or a sensitive video content. Correspondingly, the processing module 1102 is specifically configured to pause the playing when the playing of the video reaches the playing starting time.

In a possible design, the processing module 1102 is specifically configured to: recognize a picture color of a video frame included in the video; and determine that the video includes the target video content if there is a target video frame, where the target video frame is a video frame in which a proportion of a region of a target color in a picture is greater than a proportion threshold.

In a possible design, the processing module 1102 is specifically configured to: determine whether a duration of continuous appearance of the target video frame is greater than a duration threshold; and determine that the target video content is included in the video if the duration of continuous appearance of the target video frame is greater than the duration threshold.

In a possible design, the processing module 1102 is further configured to determine a playing starting time of the target video frame in the video. Correspondingly, the processing module 1102 is specifically configured to pause the playing when the playing of the video reaches the playing starting time.

In a possible design, the target color is a skin color or a blood color.

In a possible design, the transceiving module 1101 is further configured to receive a video rating setting request input by the user.

Correspondingly, the displaying module 1103 is further configured to display a first setting interface. The transceiving module 1101 is further configured to receive setting information input by the user on the first setting interface, where the setting information includes the preset video rating of the user.

In a possible design, the first setting interface includes an identifier of the user. The transceiving module 1101 is specifically configured to: receive a preset video rating input by the user on the first setting interface, and use the preset video rating as the preset video rating of the user.

In a possible design, the first setting interface further includes an add control, and the add control instructs to add a setting of a preset video rating of other user. The transceiving module 1101 is further configured to receive an instruction for selecting the add control from the user.

Correspondingly, the displaying module 1103 is further configured to display a second setting interface. The transceiving module 1101 is further configured to receive an identifier and the preset video rating of the other user input by the user on the second setting interface.

In a possible design, the setting information includes an identifier of at least one user and a preset video rating corresponding to an identifier of each user.

Correspondingly, the processing module 1102 is further configured to: acquire a facial image of the user; determine the identifier of the user according to the facial image; and determine the preset video rating of the user according to the identifier of the user and the setting information.

In a possible design, the processing module 1102 is specifically configured to determine the identifier of the user according to the facial image and a correspondence between the facial image and the identifier of the user.

In a possible design, a quantity of the identifier of the user is more than one.

The processing module 1102 is specifically configured to: determine video ratings of respective users watching the video according to identifiers of the respective users watching the video and the setting information; and determine a lowest video rating among the users watching the video as the preset video rating of the user.

In a possible design, the displaying module 1103 is specifically configured to display a prompt interface, and the prompt interface instructs the user to input permission information for watching the target video content.

In a possible design, the permission information is a verification password or biological information of the user.

In a possible design, the transceiving module 1101 is further configured to receive the permission information input by the user and the processing module 1102 is further configured to verify whether the permission information input by the user is correct. Correspondingly, if the permission information input by the user is correct, the displaying module 1103 is further configured to play the target video content.

Correspondingly, if the permission information input by the user is incorrect, the displaying module 1103 is further configured to skip playing the target video content.

In a possible design, a close control is displayed on the prompt interface, and the close control instructs to skip playing the target video content. Correspondingly, the displaying module 1103 is further configured to skip playing the target video content if an instruction for selecting the close control is received from the user.

In a possible design, the transceiving module 1101 is further configured to: request the video from a server, receive a video frame in the video from the server, and buffer the video frame.

Correspondingly, the displaying module 1103 is further configured to play the buffered video frame.

Correspondingly, the processing module 1102 is specifically configured to determine whether the target video content is included in the buffered video frame.

The video playing apparatus provided in this embodiment has similar principles and technical effects to the foregoing video playing method, which will not be repeated here.

Figure 12:
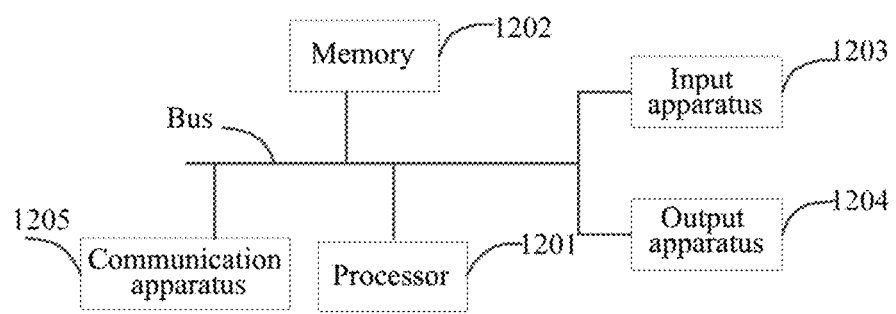
FIG. 12 is a schematic structural diagram of an electronic device provided by the present application.

According to embodiments of the present application, the present application also provides an electronic device and a readable storage medium. FIG. 12 is a schematic structural diagram of an electronic device provided by the present application. The electronic device may be the terminal device shown in the above embodiments. The components shown herein, connections and relationships therebetween, and functions thereof are merely exemplary, and are not intended to limit the implementation of the present application described and/or required herein.

As shown in FIG. 12, the electronic device includes: one or more processors 1201, a memory 1202, and interfaces for connecting various components, including a high-speed interface and a low-speed interface. The various components are connected to each other by using different buses, and can be installed on a common motherboard or installed in other ways as required. The processor may process instructions executed in the electronic device, including instructions stored in or on the memory to display graphical information of a GUI on an external input/output apparatus (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). A processor 1201 is taken as an example in FIG. 12.

The memory 1202 is the non-transitory computer-readable storage medium provided by the present application. The memory stores instructions executable by at least one processor, so that the at least one processor executes the video playing method provided in the present application. The non-transitory computer-readable storage medium of the present application stores computer instructions, which are used to cause a computer to execute the video playing method provided in the present application.

The memory 1202, as a non-transitory computer-readable storage medium, may be used to store non-transitory software programs, non-transitory computer executable programs and modules, such as program instructions/modules corresponding to the video playing method in the embodiments of the present application. The processor 1201 executes various functional applications and data processing of a server, i.e., implementing the video playing method in the foregoing method embodiments, by running non-transitory software programs, instructions, and modules stored in the memory 1202.

The memory 1202 may include a program storage area and a data storage area. The program storage area may store an operating system and an application program required by at least one function; the data storage area may store data created by the use of the electronic device for executing the video playing method. In addition, the memory 1202 may include a high-speed random access memory, and may also include a non-transitory memory, such as at least one magnetic disk storage device, a flash memory device, or other non-transitory solid-state storage devices. In some embodiments, the memory 1202 may optionally include memories remotely provided with respect to the processor 1201, and these remote memories may be connected to the electronic device for executing the video playing method through a network. Examples of the aforementioned network include, but are not limited to, the Internet, an intranet, a local area network, a mobile communication networks, and combinations thereof.

The electronic device for the video playing method may further include: an input apparatus 1203, an output apparatus 1204, and a communication apparatus 1205. The communication apparatus 1205 is configured to implement communication with the server, and is configured to perform the operations of the transceiving module 1101 described above. The processor 1201, the memory 1202, the input apparatus 1203, the output apparatus 1204, and the communication apparatus 1205 may be connected by a bus or in other ways. The connection through a bus is taken as an example in FIG. 12.

The input apparatus 1203 may receive input numeric or character information, and generate key signal inputs related to user settings and function control of the electronic device for executing the video playing method, such as a touch screen, a remote control, a keypad, a mouse, a track pad, a touch pad, a pointing stick, one or more mouse buttons, a trackball, a joystick and other input apparatuses. The output apparatus 1204 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein can be implemented in digital electronic circuit systems, integrated circuit systems, application specific ASICs (application specific integrated circuits), computer hardware, firmware, software, and/or combinations thereof. These various implementations may include: implementation in one or more computer programs that may be executed and/or interpreted on a programmable system including at least one programmable processor. The programmable processor may be a dedicated or general-purpose programmable processor, which can receive data and instructions from a storage system, at least one input apparatus, and at least one output apparatus, and transmit data and instructions to the storage system, the at least one input apparatus, and the at least one output apparatus.

These computer programs (also called programs, software, software applications, or codes) include machine instructions for programmable processors, and high-level procedures and/or object-oriented programming languages, and/or assembly/machine languages can be used to implement these computer programs. As used herein, the terms "machine-readable medium" and "computer-readable medium" refer to any computer program product, device, and/or apparatus used to provide machine instructions and/or data to a programmable processor (for example, magnetic disks, optical disks, memories, programmable logic devices (PLD)), including machine-readable media that receive machine instructions as machine-readable signals. The term "machine-readable signal" refers to any signal used to provide machine instructions and/or data to a programmable processor.

In order to provide interaction with users, the systems and technologies described here can be implemented on a computer that has: a display apparatus used to display information to users (for example, CRT (cathode ray tube) or LCD (liquid crystal display) monitors); and a keyboard and a pointing apparatus (for example, a mouse or a trackball), through which the users can provide input to the computer. Other types of apparatuses can also be used to provide interaction with users; for example, the feedback provided to the user can be any form of sensory feedback (for example, visual feedback, auditory feedback, or tactile feedback); and any form of input (including sound input, voice input or tactile input) can be used to receive inputs from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the users can interact with the implementation of the system and technology described herein), or a computing system including any combination of such back-end components, middleware components, or front-end components. The components of the system can be connected to each other through any form or medium of digital data communication (for example, a communication network). Examples of the communication network include: a local area network (LAN), a wide area network (WAN), and the Internet.

The computer system can include clients and servers. The clients and servers are generally far away from each other and usually interact through a communication network. The relationship between the clients and the servers is generated through computer programs running on corresponding computers and having a client-server relationship with each other.

It should be understood that steps can be reordered, added or deleted in the various forms of processes shown above. For example, the steps described in the present application can be executed in parallel, sequentially, or in a different order, as long as the desired result of the technical solution disclosed in the present application can be achieved, which is not limited herein.

The foregoing specific implementations do not constitute a limitation on the protection scope of the present application. Those skilled in the art should understand that various modifications, combinations, sub-combinations, and substitutions can be made according to design requirements and other factors. Any amendments, equivalent substitutions and improvements made within the spirit and principles of the present application shall be included in the protection scope of the present application.

What is claimed is:

1. A video playing method, comprising:
receiving a video playing request input by a user, and starting playing a video that is requested;
pausing the playing when the playing of the video reaches a target video content, wherein the target video content is of a higher video rating than a preset video rating of the user; and pushing prompt information to the user, wherein the prompt information is used to prompt the user that the target video content to be played is not suitable for the user to watch;

wherein before starting playing the video that is requested, the method further comprising:

determining whether the target video content is comprised in the video; and executing the step of pausing the playing when the playing of the video reaches the target video content, if the target video content is comprised in the video;

the determining whether the target video content is comprised in the video comprises:

inputting the video into a pre-trained video content recognition model to obtain a sensitive video content comprised in the video and a video rating of the sensitive video content; and determining whether the target video content is comprised in the sensitive video content according to the preset video rating of the user;

the method further comprising:

acquiring an identifier of a video frame of the target video content in the video;

determining a playing starting time of the target video content in the video according to the identifier of the video frame; and correspondingly, the pausing the playing when the playing of the video reaches the target video content comprises:

pausing the playing when the playing of the video reaches the playing starting time.

2. The method according to claim 1, wherein the determining whether the target video content is comprised in the video further comprises:

determining whether file information of the video comprises indication information, wherein the indication information is used to indicate whether the target video content is comprised in the video; or determining whether file information of the video comprises indication information, wherein the indication information is used to indicate whether the video comprises a sensitive video content and a video rating of the sensitive video content, and determining whether the target video content is comprised in the sensitive video content according to the preset video rating of the user, if the indication information is comprised in the file information of the video.

3. The method according to claim 2, wherein the file information of the video further comprises a playing starting time of the target video content or the sensitive video content; and correspondingly, the pausing the playing when the playing of the video reaches the target video content comprises:

pausing the playing when the playing of the video reaches the playing starting time.

4. The method according to claim 1, wherein the determining whether the target video content is comprised in the video further comprises:

recognizing a picture color of a video frame comprised in the video; and determining that the target video content is comprised in the video if there is a target video frame, wherein the target video frame is a video frame in which a proportion of a region of a target color in a picture is greater than a proportion threshold, and the target color is a skin color or a blood color.

5. The method according to claim 4, wherein the determining that the target video content is comprised in the video comprises:

determining whether a duration of continuous appearance of the target video frame is greater than a duration threshold; and determining that the target video content is comprised in the video if the duration of continuous appearance of the target video frame is greater than the duration threshold.

6. The method according to claim 4, wherein the pausing the playing when the playing of the video reaches the target video content comprises:

determining a playing starting time of the target video frame in the video; and pausing the playing when the playing of the video reaches the playing starting time.

7. An electronic device, comprising:

at least one processor; and a memory communicatively connected with the at least one processor;

wherein the memory stores instructions executable by the at least one processor, and the instructions are executed by the at least one processor to enable the at least one processor to:

receive a video playing request input by a user, and start playing a video that is requested;

pause the playing when the playing of the video reaches a target video content, wherein the target video content is of a higher video rating than a preset video rating of the user; and push prompt information to the user, wherein the prompt information is used to prompt the user that the target video content to be played is not suitable for the user to watch;

before starting playing the video that is requested, the instructions are further executed by the at least one processor to enable the at least one processor to:

input the video into a pre-trained video content recognition model to obtain a sensitive video content comprised in the video and a video rating of the sensitive video content;

determine whether the target video content is comprised in the sensitive video content according to the preset video rating of the user; and execute the step of pausing the playing when the playing of the video reaches the target video content, if the target video content is comprised in the video;

the instructions are further executed by the at least one processor to enable the at least one processor to:

acquire an identifier of a video frame of the target video content in the video;

determine a playing starting time of the target video content in the video according to the identifier of the video frame; and correspondingly, pause the playing when the playing of the video reaches the playing starting time.

8. The device according to claim 7, wherein the instructions are executed by the at least one processor to enable the at least one processor to:

receive a video rating setting request input by the user, and display a first setting interface; and receive setting information input by the user on the first setting interface, wherein the setting information comprises the preset video rating of the user.

9. The device according to claim 8, wherein the first setting interface comprises an identifier of the user, and the instructions are executed by the at least one processor to enable the at least one processor to:

receive a preset video rating input by the user on the first setting interface, and use the preset video rating as the preset video rating of the user.

10. The device according to claim 9, wherein the first setting interface further comprises an add control, the add control instructing to add a setting of a preset video rating of other user, and the instructions are executed by the at least one processor to enable the at least one processor to:

receive an instruction for selecting the add control from the user, and display a second setting interface; and receive an identifier and the preset video rating of the other user input by the user on the second setting interface.

11. The device according to claim 10, wherein the setting information comprises an identifier of at least one user and a preset video rating corresponding to an identifier of each user, and the instructions are executed by the at least one processor to enable the at least one processor to:

acquire a facial image of the user;

determine the identifier of the user according to the facial image; and determine the preset video rating of the user according to the identifier of the user and the setting information.

12. The device according to claim 11, wherein the instructions are executed by the at least one processor to enable the at least one processor to:

determine the identifier of the user according to the facial image and a correspondence between the facial image and the identifier of the user.

13. The device according to claim 11, wherein a quantity of the identifier of the user is more than one, and the instructions are executed by the at least one processor to enable the at least one processor to:

determine video ratings of respective users watching the video according to identifiers of the respective users watching the video and the setting information; and determine a lowest video rating among the users watching the video as the preset video rating of the user.

14. The device according to claim 7, wherein the instructions are executed by the at least one processor to enable the at least one processor to:

display a prompt interface, wherein the prompt interface instructs the user to input permission information for watching the target video content, wherein the permission information is a verification password or biological information of the user;

receive the permission information input by the user, and verify whether the permission information input by the user is correct; and play the target video content if the permission information input by the user is correct; and skip playing the target video content if it is determined that the permission information input by the user is incorrect.

15. The device according to claim 14, wherein a close control is displayed on the prompt interface, the close control instructing to skip playing the target video content, and the instructions are executed by the at least one processor to enable the at least one processor to:

skip playing the target video content if an instruction for selecting the close control is received from the user.

16. The device according to claim 7, wherein the instructions are executed by the at least one processor to enable the at least one processor to:

request the video from a server;

receive a video frame in the video from the server, and buffer the video frame;

play the buffered video frame; and determine whether the target video content is comprised in the buffered video frame.

17. A non-transitory computer-readable storage medium storing computer instructions, wherein the computer instructions are used to cause a computer to execute the method according to claim 1.

18. A video playing method, comprising:

receiving a video playing request input by a user, and starting playing a video that is requested;

pausing the playing when the playing of the video reaches a target video content, wherein the target video content is of a higher video rating than a preset video rating of the user; and pushing prompt information to the user, wherein the prompt information is used to prompt the user that the target video content to be played is not suitable for the user to watch;

wherein before starting playing the video that is requested, the method further comprising:

determining whether the target video content is comprised in the video; and executing the step of pausing the playing when the playing of the video reaches the target video content, if the target video content is comprised in the video;

the determining whether the target video content is comprised in the video comprises:

recognizing a picture color of a video frame comprised in the video; and determining that the target video content is comprised in the video if there is a target video frame, wherein the target video frame is a video frame in which a proportion of a region of a target color in a picture is greater than a proportion threshold, and the target color is a skin color or a blood color.

19. The method according to claim 18, wherein the determining that the target video content is comprised in the video comprises:

determining whether a duration of continuous appearance of the target video frame is greater than a duration threshold; and determining that the target video content is comprised in the video if the duration of continuous appearance of the target video frame is greater than the duration threshold.

20. The method according to claim 18, wherein the pausing the playing when the playing of the video reaches the target video content comprises:

determining a playing starting time of the target video frame in the video; and pausing the playing when the playing of the video reaches the playing starting time.

* * * * *